United States Patent [19]
Kimura

[11] Patent Number: 5,799,389
[45] Date of Patent: Sep. 1, 1998

[54] METHOD FOR PRODUCING MAGNETIC HEAD

[75] Inventor: Hitoshi Kimura, Miyagi, Japan

[73] Assignee: Sony Corporation, Tokyo, Japan

[21] Appl. No.: 898,777

[22] Filed: Jul. 23, 1997

Related U.S. Application Data

[63] Continuation of Ser. No. 502,454, Jul. 14, 1995, abandoned.

[30] Foreign Application Priority Data

Jul. 15, 1994 [JP] Japan ..................... 6-164362

[51] Int. Cl.⁶ .................. G11B 5/187; G11B 5/235
[52] U.S. Cl. .................. 29/603.21; 29/603.16; 360/121; 360/127
[58] Field of Search ............... 29/603.16, 603.21, 29/603.27, 417; 360/119–121, 127; 156/268

[56] References Cited

U.S. PATENT DOCUMENTS

| | | | |
|---|---|---|---|
| 3,624,897 | 12/1971 | Reade et al. | 29/603.16 |
| 5,003,688 | 4/1991 | Terador et al. | 29/603.21 X |
| 5,022,140 | 6/1991 | Tsutaki et al. | 29/603.21 X |
| 5,161,300 | 11/1992 | Nanjyo | 29/603.21 X |
| 5,208,965 | 5/1993 | Ozeki et al. | 29/603.21 X |
| 5,276,959 | 1/1994 | Yamamoto | 29/603.21 |

FOREIGN PATENT DOCUMENTS

| | | |
|---|---|---|
| 0 466 159 | 1/1992 | European Pat. Off. . |
| 0 558 235 | 9/1993 | European Pat. Off. . |
| 0 646 907 | 4/1995 | European Pat. Off. . |

*Primary Examiner*—Peter Vo
*Attorney, Agent, or Firm*—Hill & Simpson

[57] ABSTRACT

A head chip of a magnetic head is produced by a method in which magnetic core half blocks, each having plural track width delimiting grooves on its major surface and having a magnetic metal film of a soft magnetic metal material formed on the major surface, are abutted to each other with a gap material in-between to form a magnetic head block which is then sliced to give plural head chips for the magnetic head. Each track width delimiting groove is polygonally-shaped in cross-section and has at least two bends. This enables suppression of cracks of exfoliation of the magnetic metal film otherwise caused in the magnetic core during its fabrication to improve product yield and operational reliability.

3 Claims, 4 Drawing Sheets

1

METHOD FOR PRODUCING MAGNETIC HEAD

This is a continuation of application Ser. No. 08/502,454, filed Jul. 14, 1995 now abandoned.

BACKGROUND OF THE INVENTION

This invention relates to a so-called metal-in-gap magnetic head in which magnetic core halves each having a magnetic metal film of a soft magnetic metal material formed on its major surface are bonded together on the magnetic gap surfaces thereof to each other.

In magnetic recording/reproducing apparatus, such as video tape recorders or digital audio tape recorders, investigations into short-wavelength recording of information signals are proceeding with a view to achieving high picture quality. In keeping therewith, a high coercive magnetic recording medium, such as a so-called metal tape employing magnetic metal powders as magnetic powders or an evaporated tape in which a magnetic metal material is directly deposited on a base film, is becoming popular.

In the field of magnetic heads, investigations are proceeding for meeting such tendency. Thus a variety of so-called metal-in-gap heads (MIG heads), in which a soft magnetic material is employed as a core material, are being developed as a magnetic head suitable for use with a high coercive magnetic recording medium.

In the process for preparation of the MIG head, plural band-shaped track width delimiting grooves 101 are formed on one major surface of a magnetic core half 103 so that a distance corresponding to a gap width is left between adjoining track width delimiting grooves 101. On a gap surface M of the magnetic core half block 103 is formed a magnetic metal film 102 of a soft magnetic metal material.

Two of such magnetic core half blocks 103 are prepared and abutted to each other so that the gap surfaces M of the two magnetic core half blocks 103 face each other, as shown in FIG. 2. By the track width delimiting grooves 101 thus abutted to and facing each other, there are defined openings 104 constituting track width delimiting grooves. A fusion glass material is poured into the openings 104 for bonding the magnetic core half blocks together for forming a magnetic head block having plural magnetic gaps g.

From the magnetic head block 106 are sliced plural head chips to a pre-set chip width along a broken line in FIG. 2. These head chips are subsequently processed with abutment width processing or coil winding for producing the MIG heads.

The shape of each track width delimiting groove 101 on a cross-sectional surface extending at right angles to the longitudinal direction of the block 103 is smooth substantially circular shape as shown in FIGS. 3 which shows the track width delimiting groove of FIGS. 1 and 2 to an enlarged scale. Alternatively, it has a bend 111, as shown in FIG. 4. Consequently, the opening 104 of the magnetic head block 106, defined by the magnetic core half blocks 103 abutted to each other on the gap surfaces M, are smooth circular shape or a diamond shape.

With the above-described MIG head, the head chip is liable to fracture such as cracking, or the magnetic metal film 102 tends to be peeled off, when the head chips are sliced to the required chip width from the magnetic head block 106, thus raising serious problems in connection with the product yield.

The above mentioned problems are thought to be ascribable mainly to the above-described shape of the track width delimiting grooves 101 or openings 104 of the magnetic core half block 103 or the magnetic head block 106. The reason is presumably such that, when slicing respective head chips, strong stress is applied to the magnetic metal film 102 or the glass material 105 due to the shape of the track width delimiting groove 101 or the opening 104.

SUMMARY OF THE INVENTION

It is therefore a principal object of the present invention to provide a method for producing a magnetic head in which it is possible to suppress cracking of the magnetic core or the exfoliation of the magnetic metal film during manufacture of the magnetic head for improving the product yield and operational reliability of the magnetic head.

According to the present invention, there is provided a method for producing a metal-in-gap magnetic head by forming a magnetic metal film of a soft magnetic material on at least one of gap surfaces of a pair of magnetic core halves, and abutting the magnetic core halves so that the gap surfaces face each other for forming a magnetic head bloc. According to the present invention, before the step of forming the magnetic head block, a plurality of track width delimiting grooves are formed in each of the magnetic core halves, and each of the track width delimiting grooves is polygonally-shaped in cross-section and has at least two bends. The step of forming the magnetic head blocks includes a step of pouring a glass material for fusion into the plural polygonally-shaped track width delimiting grooves, and the magnetic head block is sliced to a pre-set width so that a gap is comprised within the width for forming each head chip. If assumed that the polygonally-shaped track width delimiting grooves are divided at a number of equal width portions corresponding to the number of the bends, each one bend is present in each equal width portion of the polygonally-shaped track width delimiting groove.

In the above-described MIG head, each track width delimiting groove of each of the magnetic core half blocks as essential components of the MIG head is polygonally-shaped in a cross-sectional surface extending at right angles to the longitudinal direction of the track width delimiting groove, and has plural bends.

With the MIG head, having the magnetic metal film parallel to and disposed at the site of the magnetic gap, these bends operate for releasing the stress generated in the glass material when slicing the head chips 24 from the magnetic head block formed by the magnetic head half blocks as a result of difference in thermal expansion coefficients of the magnetic core, glass material and the magnetic metal film as the constituent elements of the MIG head, thereby significantly improving durability against stress induced by machining. In addition, any stress operating on the magnetic metal film formed on each track width delimiting groove is also released for prohibiting peeling of the magnetic metal film.

It is crucial that practically two or more bends, herein three bends, be formed in the track width delimiting groove. The reason is that the total effective stress applied to the magnetic metal film is decreased exponentially with increase in the number of the bends. Specifically, if approximation is made on the assumption that the stress operating on the magnetic metal film in each bend is resolved in two directions, the total stress F may be represented as $F=k2-N$, where k is a proportionality constant.

In addition, by setting the angle of bending specifying the degree of bending at each bend so as to be not less than 8°, and by constituting the MIG head so that each one bend is present in each region of the track width delimiting groove resulting from division in a direction perpendicular to the magnetic gap in a cross-sectional plane perpendicular to the longitudinal direction of the groove. the bend in the cross-sectional plane of the track width delimiting groove is reduced in position deviation for homogenizing the stress acting on the bends for further releasing the total effective stress operating on the magnetic metal film.

According to the present invention, a head chip of a magnetic head is produced by a method in which magnetic core half blocks. each having plural track width delimiting grooves on its major surface and having a magnetic metal film of a soft magnetic metal material formed on the major surface. are abutted to each other with a gap material in-between to form a magnetic head block which is then sliced to give plural head chips for the magnetic head. Each track width delimiting groove is polygonally-shaped in cross-section and has at least two bends. This enables suppression of cracks of exfoliation of the magnetic metal film otherwise caused in the magnetic core during its fabrication to improve product yield and operational reliability.

DESCRIPTION OF THE PREFERRED EMBODIMENT

Figure 1:
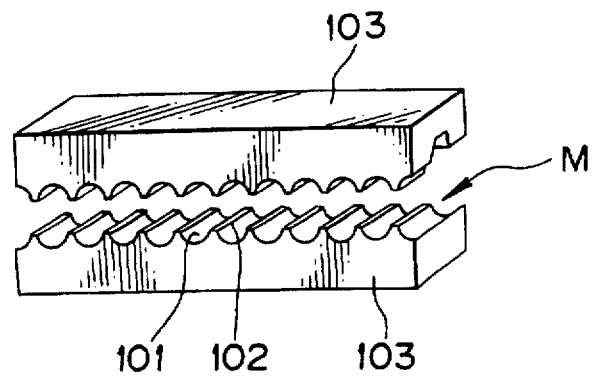
FIG. 1 is a schematic perspective view showing the state in which plural band-shaped track width delimiting grooves are formed in each magnetic core half block of a conventional magnetic head.
Figure 2:
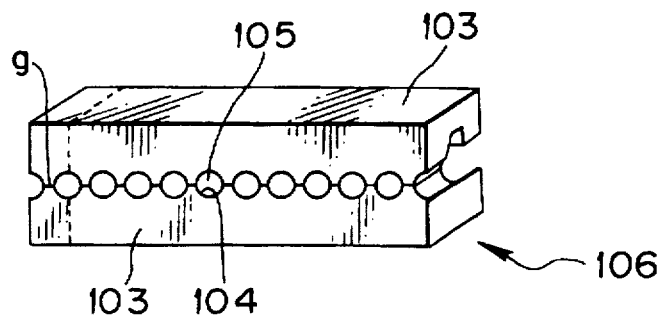
FIG. 2 is a schematic perspective view showing the state in which two magnetic core half blocks of the conventional magnetic head are abutted to each other and bonded together with a fusion glass material.

Referring to the drawings. a preferred illustrative embodiment of the present invention will be explained in detail.

In preparing a magnetic head of the present invention, plural band-shaped track width delimiting grooves are formed on one major surface with a gap width interval from one another. A magnetic metal film formed of a soft magnetic material is formed on the major surface for forming a gap surface for producing a magnetic core half block. A pair of such magnetic head core half blocks are abutted to each other with the gap surfaces facing each other with a gap material in-between for preparing a magnetic head block having plural magnetic gaps. From the magnetic head block are sliced plural head chips to required head chips to produce a so-called metal-in-gap type magnetic head (MIG head).

Figure 5:
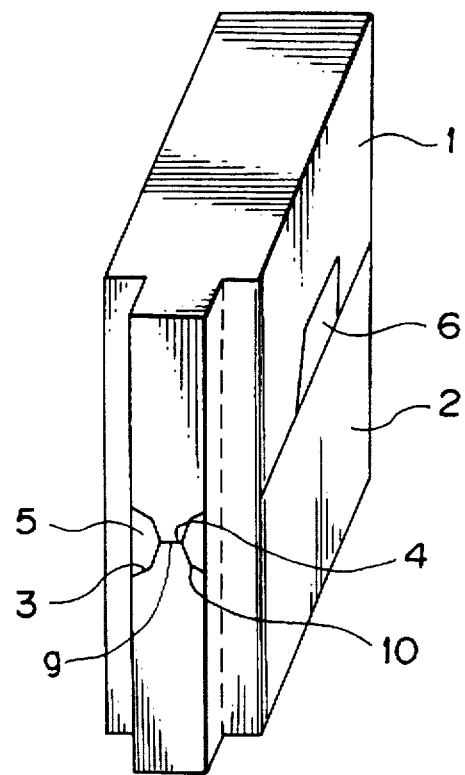
FIG. 5 is a schematic perspective view showing a magnetic head according to an embodiment of the present invention.

This MIG head has a magnetic core which is formed by forming a magnetic metal film 4 of a soft magnetic metal material on a major surface of each of a pair of magnetic core halves 1, 2 carrying a track width delimiting groove 3 and by abutting the major surfaces of the magnetic core halves 1, 2 with a gap material in-between for forming a magnetic gap g; as shown in FIG. 5. When abutting the magnetic core halves 1, 2, a glass material for fusion 5 is poured into the track width delimiting grooves 3 for bonding the magnetic core halves 1 and 2 together.

Each of the magnetic core halves 1 and 2 is then machined for forming a guide groove, not shown, for placing a coil for flowing the recording current therein, and a slot for winding 6 is then formed in the magnetic core half 1. A winding. not shown, is placed in the guide groove and the slot for winding 6 for constituting the MIG head.

The track width delimiting groove 3, formed in each of the magnetic ore halves 1, 2 of the MIG head. has a pair of bends 10 which are symmetrically arranged on the left and right sides of the magnetic gap g as the center.

For forming the track width delimiting groove 3 to this shape, plural track width delimiting grooves 3 are formed on the major surfaces of the magnetic core half blocks 1, 2, so that, when the head chip is sliced during fabrication of the MIG head, the track width delimiting grooves 3 are shaped as shown in FIG. 5.

Figure 6:
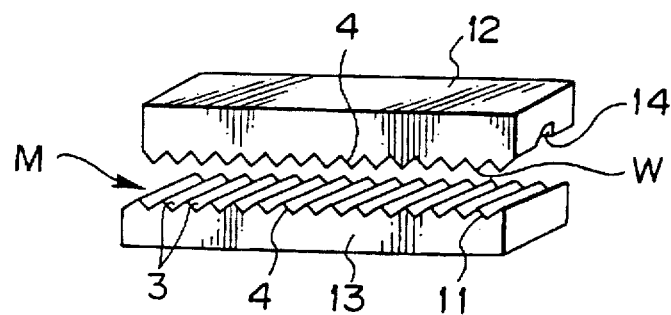
FIG. 6 is a schematic perspective view showing the state in which plural band-shaped track width delimiting grooves are formed in each magnetic core half block.

That is, for fabricating the MIG head, plural band-shaped track width delimiting grooves 3 are formed by machining or grinding on the major surfaces of a pair of magnetic core half blocks 12, 13 with a gap width length w. A slot 14, which later becomes the slot for winding 6, is formed only in the magnetic core half block 12, as shown in FIG. 6.

Figure 7:
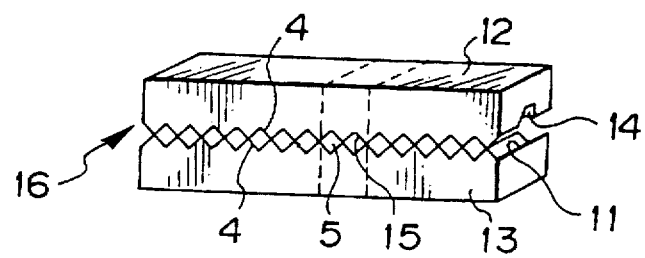
FIG. 7 is a schematic perspective view showing the state in which two magnetic core half blocks are abutted to each other and bonded together with a fusion glass material.

A magnetic metal film 4 of a soft magnetic metal material is uniformly formed on the entire major surfaces of the magnetic core half blocks carrying the track width delimiting grooves to a film thickness of several microns. The magnetic core half blocks 12, 13 are abutted to each other so that the surfaces of the blocks 12 and 13 carrying the magnetic gaps g are in contact with each other. The glass material for fusion 5 is poured at this time into openings 15 formed by abutment of the track width delimiting grooves 3 of the magnetic core half blocks 12, 13, as shown in FIG. 7. for bonding the magnetic core half blocks 12, 13 for fabricating a magnetic head block 16.

Figure 8:
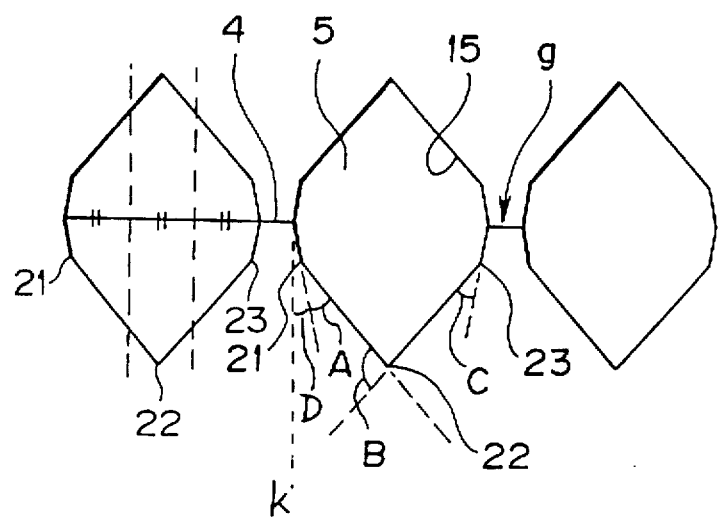
FIG. 8 schematically illustrates the shape of openings formed in a magnetic head.

The openings 15 of the magnetic heads block 16 are shaped as shown in FIG. 8. That is, each track width delimiting groove 3 of the magnetic core half block 12 or 13. which delimits the opening 15 by being abutted against each other, is polygonally-shaped in a cross-sectional surface running perpendicular to the longitudinal direction of the track width delimiting groove 3, that is shaped so as to have three bends 21, 22 and 23. Thus it is essential that two or more bends be formed in the MIG head.

The angle of bend, indicative of the degree of bending at the bends 21 to 23. is preferably not less than 8°. The angle of bend of a bend herein means an angle which one of the sides defining the bend of the track width delimiting groove 3 makes with a line of extension of the other side defining the bend. In the present embodiment, the angle which a side defining the bend 21, 22 or 23 makes with a line of extension of the other side represented by a broken line is the angle of bend A, B or C.

It is also essential that each track width delimiting groove 3 is so formed that, if each track width delimiting groove 3 is divided at equal widths in a direction perpendicular to the magnetic gap g in a cross-sectional surface extending perpendicular to the longitudinal direction of the groove 3, there is present at least one bend in each divided region. In the present embodiment, the bends 21, 22, 23 are present in the respective three regions of the groove 3 divided at equal widths in the above-described manner as shown by broken lines in FIG. 8.

Figure 9:
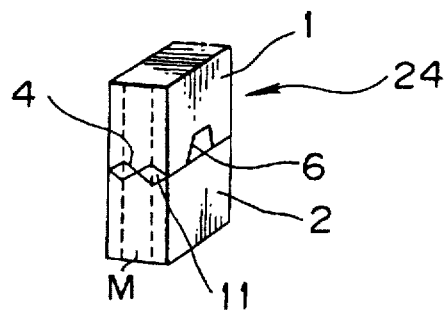
FIG. 9 is a schematic perspective view showing each prepared head chip.

The magnetic head block 16, fabricated as described above, is cut at positions so that two of the openings 15 are comprised in the resulting head chip, as indicated by two broken lines in FIG. 7, for fabricating a head chip 24 shown in FIG. 9. A surface M of each head chip which is to be a sliding contact surface for the recording medium is machined for adjusting abutment width for fabricating a magnetic core as shown in FIG. 5. A winding, not shown, is mounted on the magnetic core for completing the MIG head.

In the above-described MIG head, each track width delimiting groove 3 of each of the magnetic core half blocks 12, 13 as essential components of the MIG head is polygonally-shaped in a cross-sectional surface extending at right angles to the longitudinal direction thereof and has the bends 21 to 23.

With the MIG head, having the magnetic metal film 4 parallel to and disposed on the site of the magnetic gap g, these bends 21 to 23 operate for releasing the stress generated in the glass material 5, as a result of difference in thermal expansion coefficients of the magnetic core, glass material 5 and the magnetic metal film 4, as the constituent elements of the MIG head, when slicing the head chips 24 from the magnetic head block 16 formed by the magnetic head half blocks 12, 13, thereby significantly improving durability against stress induced by machining. In addition, any stress acting on the magnetic metal film 4 formed on each track width delimiting groove 3 is also released so that the magnetic metal film 4 may be prevented from being peeled off.

It is essential that practically two or more bends, herein three bends, be formed in the track width delimiting groove 3. The reason is that the total effective stress applied to the magnetic metal film 4 is presumably decreased exponentially with increase in the number of the bends. Specifically, if approximation is made on the assumption that the stress acting on the magnetic metal film 4 in each bend is resolved in two directions, the total stress F may be represented as F=k2-N, where k is a proportionality constant.

In addition, by setting the angle of bending specifying the degree of bending at each bend so as to be 8° or more, and by constituting the MIG head so that each one bend is present in each region of the track width delimiting groove 3 resulting from division in a direction perpendicular to the magnetic gap g in a cross-sectional plane perpendicular to the longitudinal direction of the groove 3, the bend in the cross-sectional plane of the track width delimiting groove is reduced in position offset for homogenizing the stress acting on the bends for further releasing the total effective stress acting on the magnetic metal film 4.

Figure 3:
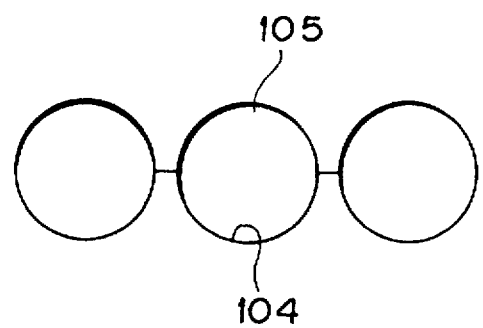
FIG. 3 schematically illustrates a typical shape of openings formed in the conventional magnetic head.
Figure 4:
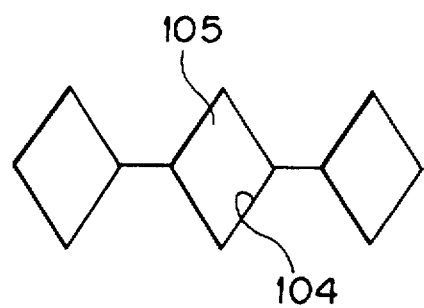
FIG. 4 schematically illustrates another typical shape of the openings formed in the conventional magnetic head.

An experimental example in which the working states when the MIG head of the above-described embodiment (head A) and a conventional MIG head derived from two magnetic core half blocks 103, each having a substantially semicircular track width delimiting groove 101 as shown in FIG. 3, are fabricated from the magnetic head blocks 16 and 106, respectively, is explained.

This experiment was conducted for checking the degree of working defects when the head chips of the MIG heads are sliced from the magnetic head blocks. Specifically, the experiment was conducted for checking the percentage A of MIG heads suffering from fractures of the head chips such as cracking and the percentage B of the MIG heads suffering from exfoliation of the magnetic metal films 4, 102, among a pre-set number of the MIG heads produced as described above.

Figure 10:
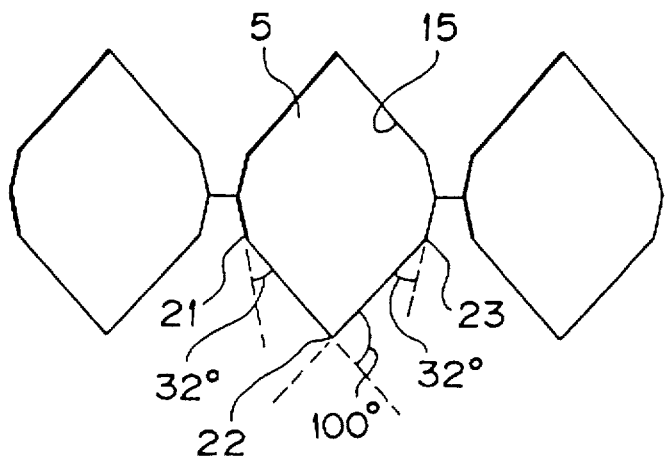
FIG. 10 schematically illustrates the shape of the openings of a magnetic head sample according to an experimental example.
Figure 11:
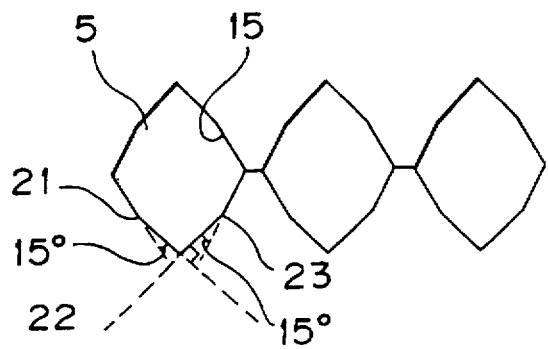
FIG. 11 schematically illustrates the shape of the openings of another magnetic head sample according to an experimental example.
Figure 12:
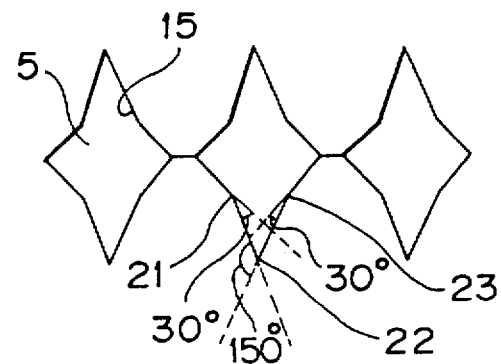
FIG. 12 schematically illustrates the shape of the openings of still another magnetic head sample according to an experimental example.

As for the head A, the angles of bend A, B and C for the bends 21 to 23 were set so that the angle A=angle B and an angle D which a line normal to the magnetic gap g to a line segment k was set to 8° (angle D=8°). Three samples, namely a sample 1 having the angle of bend A=32° and the angle of bend B=100°, as shown in FIG. 10, a sample 2 having the angle of bend A=15° and the angle of bend B=90°, as shown in FIG. 11 and a sample 3 having the angle of bend A=30° and the angle of bend B=150°, as shown in FIG. 12, were checked.

The results of the experiments were as follows: The percentages A and B for the conventional head B showed non-negligibly large values of 7.2% and 4.1%, respectively, while the samples 1, 2 and 3 of the head A showed fully satisfactory values of the percentages A and B of 0.5% and 0.1%, 1.2% and 0.1% and 1.0% and 0.8%, respectively.

The above results testify to superiority of the magnetic head of the present embodiment to the conventional magnetic head.

What is claimed is:

1. A method for producing a metal-in-gap magnetic head, comprising the steps of:

(a) providing first and second core half members, each core half member having a facing surface and at least one core half, each core half having an abutting facing surface which when abutted and mated with another core half abutting facing defines a magnetic gap;

(b) forming a magnetic metal thin film on at least one of the core half abutting facing surfaces;

(c) forming track width delimiting grooves on opposite sides of each core half and each core half abutting surface to define between a gap width of the magnetic gap, each track width delimiting groove extending in a direction parallel to the abutting facing surface of its respective core half, each track width delimiting groove having at least four distinct side walls with at least three distinct bends between them, each track width delimiting groove having two of its side walls positioned to extend obliquely from the facing surface of their respective core half member and to extend in a converging manner toward each other, each of the bends of each track width delimiting groove being of an angle of not less 8°;

(d) abutting said first and second core members together to form a magnetic head block out of their respective core halves with the abutting facing surfaces thereof in registry to form a magnetic gap, and with the track width delimiting grooves on opposite sides of each core half in registry to form channels on opposite sides of the magnetic gap;

(e) providing molten glass material into said channels on opposite sides of said magnetic gap; and (f) cutting said metal-in-gap magnetic head out from said abutted magnetic core half member by slicing through said magnetic core half member through said channels.

2. The method of claim 1, wherein each of said core half member comprises a plurality of core halves.

3. The method of claim 1, wherein said magnetic head is cut out from said abutted magnetic core half member by cutting thereof, said magnetic core half member through midpoints of said channels.

* * * * *